Aug. 23, 1966     N. J. DI NAPOLI, JR     3,268,023
VARIABLE TRACTION SELF-PROPELLED AIR BEARING
SUPPORTED LOAD TRANSPORT DEVICE
Filed Sept. 10, 1964

INVENTORS
Nicholas J. DiNapoli, Jr.
BY
W. F. Wagner
ATTORNEY

United States Patent Office 3,268,023
Patented August 23, 1966

3,268,023
VARIABLE TRACTION SELF-PROPELLED AIR BEARING SUPPORTED LOAD TRANSPORT DEVICE
Nicholas J. Di Napoli, Jr., Goleta, Calif., assignor to General Motors Corporation, Detroit, Mich., a corporation of Delaware
Filed Sept. 10, 1964, Ser. No. 396,809
10 Claims. (Cl. 180—7)

This invention relates to self-propelled air bearing supported load transport devices and more particularly to such devices in which the load is supported in frictionless relation to the ground by low unit loading air bearing means.

The invention is concerned primarily with devices of the general type described in which propulsion is accomplished by ground engaging wheels connected to the load supporting structure which are urged into tractive engagement with the ground without affecting the load supporting function of the air bearing.

As used herein, the expression "low unit loading air bearing" is intended to denote bearings of the type in which superatmospheric air at relatively low pressure is distributed over an effective support area substantially equal to the plan form area of the support on which the load is imposed. As used hereinafter, the term "positive air bearing" is intended to denote air bearings in which the air medium is maintained at a superambient pressure, while the term "negative air bearing" is intended to denote air bearings in which the air medium is maintained at a subambient pressure.

According to the general features of the invention, a suitable preferably rigid load supporting platform has disposed therebeneath a low unit loading air bearing device which functions to provide the medium of frictionless support of the load relative to the ground. At each end thereof, the main load supporting platform has connected thereto, in a manner permitting free vertical movement, one or more powered traction wheels which are surrounded by negative air bearing means operative to impose a downwardly directed load on the wheels sufficient to establish tractive engagement with the ground. A suitable air pressure generating mechanism or blower is mounted on the load supporting device and connected to the positive air bearing and the negative air bearing so that during operation the intake side of the blower creates a subambient pressure condition in the negative air bearing tending to urge the traction wheels into engagement with the ground while the exhaust side of the blower discharges superatmospheric air into the positive air bearing to support the load to be transported.

An object of the invention is to provide an improved self-propelled air bearing supported load carrying device.

Another object is to provide a powered traction wheel propelled device of the type described in which the wheels are maintained in tractive engagement with the ground independently of any force exerted by the air bearing supported load.

A further object is to provide a device of the type described in which tractive engagement of the driving wheels is induced by a negative air bearing mounted in fixed vertical relation to the axis of rotation of the traction wheels.

A still further object is to provide an arrangement of the stated character wherein the intake and exhaust sides of the pressure generating means are arranged with respect to the positive and negative air bearings so that appropriate pressure conditions are induced in the respective air bearings.

Yet a further object is to provide a structure of the type described including means for varying the force exerted by the negative air bearing independently of the operating level of the pressure generating means.

A still further object is to provide a device of the type described in which the traction wheels are dirigibly mounted and means are provided for remotely controlling the angular attitude thereof.

These and other objects, advantages and features of the invention will become more readily apparent as reference is had to the accompanying specification and drawing wherein.

Figure 1:
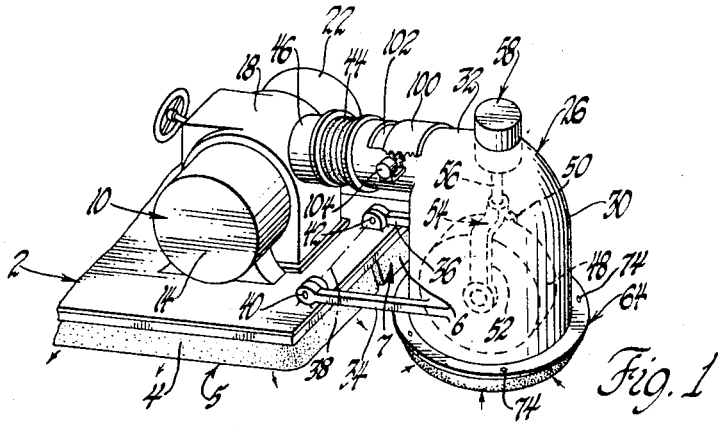
FIGURE 1 is a fragmentary perspective view of one end of a self-propelled air bearing supported device according to the invention.
Figure 2:
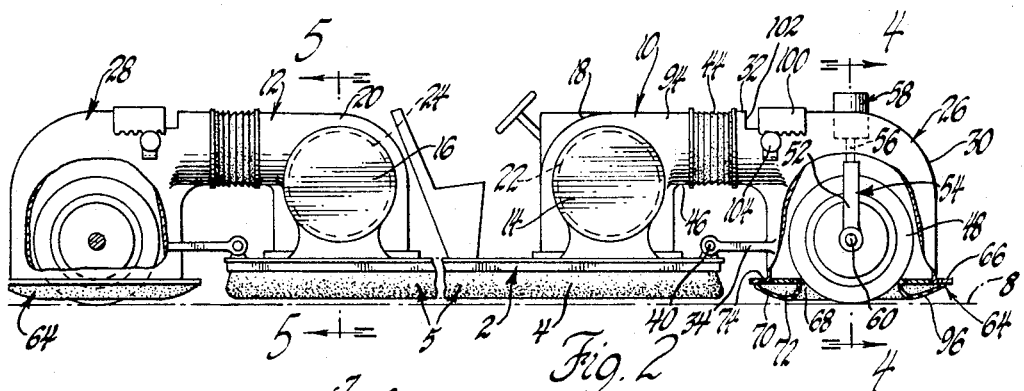
FIGURE 2 is a fragmented and foreshortened side elevational view, partly in section and with parts broken away, of a complete vehicle in accordance with the invention.
Figure 3:
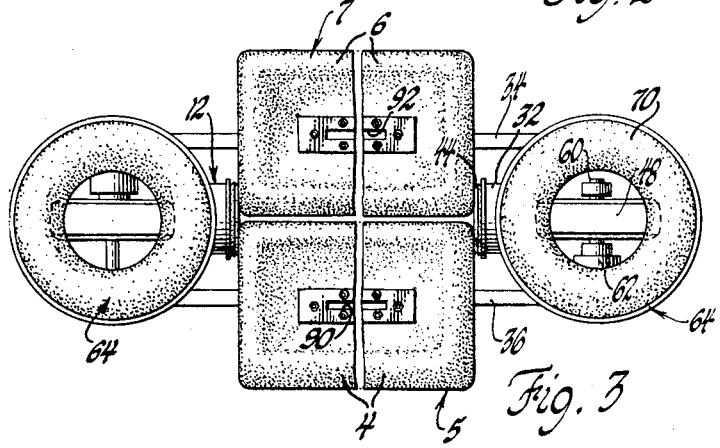
FIGURE 3 is a bottom plan view of the device shown in FIGURE 2.

Referring now to the drawing and particularly FIGURES 1 and 2, there is shown a load carrying vehicle or device in which the reference numeral 2 designates a load supporting platform having disposed therebeneath a pair of diaphragms 4 and 6 which cooperate with the platform to provide low unit loading air bearings 5 and 7 capable of supporting the platform and load carried thereon in frictionless relation with the ground 8. In the embodiment shown, the air bearings are similar to the flexible plenum chamber type air bearing shown in copending application Serial No. 4,465, Harry A. Mackie, entitled "Air Cushion Vehicle," for a complete description of which reference may be had thereto. It will be understood, however, that the present invention is not necessarily restricted to utilization of this specific form of air bearing, but may also utilize any other conventional forms. Mounted fore and aft of the load supporting platform 2 are power units 10 and 12 which comprise engine sections 14 and 16, blower sections 18 and 20, and generator sections 22 and 24. Extending fore and aft beyond the load supporting structure are traction wheel structures 26 and 28. Since both structures 26 and 28 are identical in form and components, the following description of structure 26 will be understood to apply equally to structure 28. As seen in FIGURES 1 and 2, structure 26 includes a vertically directed bell housing 30, which at its upper end merges with a longitudinal sleeve portion 32. Near its lower end, bell housing 30 is formed with laterally spaced longitudinally extending parallel arms 34 and 36, the rearward ends of which are pivotally connected to platform 2 on a horizontal transverse axis 38 by pivots 40 and 42. The rearward terminal end of sleeve 32 in turn is connected by a cylindrical accordion-pleated flexible member 44 to a forwardly extending sleeve portion 46 formed on the intake side of blower section 20. It will thus be seen that bell housing 30 is capable of limited angular movement in a vertical plane normal to the axis 38, with the variation in longitudinal space between sleeves 32 and 46 being accommodated by accordion member 44.

According to one feature of the invention, bell housing 30 has disposed therein a traction wheel 48 which is rotatably supported between the laterally spaced branches 50 and 52 of a fork member 54. Fork member 54 in turn is formed with a pillar portion 56 which is rotatably mounted on a vertical axis concentric with the surface of revolution of the bell housing 30. As seen best in FIGURE 2, the pillar portion 56 of fork member 54 is operatively connected to an electric motor driven mechanism 58 secured in the top wall of bell housing 30. Mechanism 58 is adapted for remote operation in a manner providing progressive angular movement of fork member 54 and traction wheel 48 in either direction from the normal straight ahead position shown. Since the details of construction of mechanism 58 constitutes no part of the present invention, description thereof is omitted, it being understood that any conventional reversible drive may be utilized.

Figure 4:
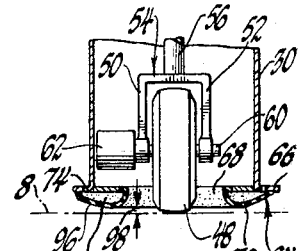
FIGURE 4 is a view looking in the direction of arrows 4—4 of FIGURE 2.

As seen best in FIGURE 4, according to another feature of the invention, the traction wheel 48 is adapted to be driven with respect to its rotating axis 60 by electric drive mechanism 62 mounted on branch 50 of fork 54 in axial alignment with the axis 60. It will be understood that both mechanisms 58 and 62 are intended to be energized by electric current derived from the generator section 22 and that control of operation of each is effected by suitable manually manipulated controls, not shown, preferably located at the remote position within convenient reach of the vehicle operator.

According to a principal feature of the invention, the traction wheel 48 is urged into tractive engagement with the ground 8 by means of a negative air bearing device 64 mounted at the lower extremity or mouth of bell housing 30. As seen best in FIGURES 2 and 4, the mouth of housing 30 is formed with an annular horizontal ring 66 having a central opening 68 which is large enough in diameter to provide clearance for rotation and dirigible movement of wheel 48. Disposed beneath annular ring 66 is an annular single convolution diaphragm 70, the outer and inner perimeters of which are connected in sealed relation with the inner and outer perimeters respectively of the ring. The annular space 72 defined between diaphragm 70 and the vertically adjacent portion of ring 66 is vented to atmosphere through ports 74 to provide a negative air bearing which is structurally and functionally similar to the device disclosed in copending application Serial No. 161,048, Harry A. Mackie, entitled "Pendant Air Bearing Load Supporting Device." It will be noted, however, that a minimum vertical clearance is maintained between the air bearing device 66 and the ground due to the vertical positioning of traction wheel 48. Hence, in operation a downward pull is exerted on bell housing 30 which effects the tractive engagement of wheel 48 with the ground 8 necessary to propel the load supporting platform 2 without the possibility of "grounding out" the air bearing and creating a suction cup effect.

Figure 5:
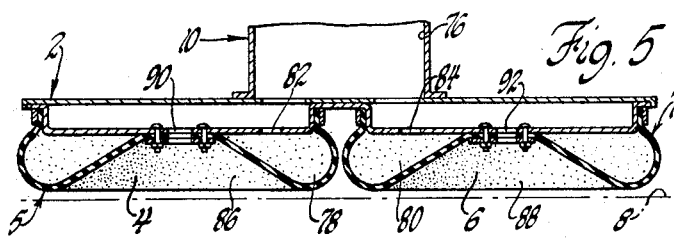
FIGURE 5 is a view looking in the direction of arrows 5—5 of FIGURE 2.

As seen best in FIGURE 5, the blower section of power unit 10 is mounted on platform 2 in a manner providing direct communication with the interior of each of two longitudinally extending flexible plenum chamber type air bearings, which as previously described correspond to the type shown in copending application Serial No. 4,465. The present construction preferably utilizes paired low pressure air bearings in side-by-side relation in order to enhance the lateral stability of the load supporting structure. As seen in FIGURE 5, the exhaust side 76 of the blower section discharges directly into the annular spaces 78 and 80 through passages 82 and 84 and into the plenum cavities 86 and 88 through passages 90 and 92. Conversely, the intake side 94 of the blower section is connected to bell housing 30 so that intake air movement commences at the peripheral mouth 96 of negative air bearing 64 and proceeds upwardly through bell housing 30 into the blower assembly. In consequence, when the blower is operated to provide superambient pressure for discharge into the positive air bearings 5 and 7, subambient pressure is created within bell housing 30 which acts over an effective area circumscribed by an imaginery circle defined by the lowermost extremity of diaphragm 70. Due to the generation of subambient pressure over this area, the interior 72 of the negative air bearing is caused to assume the configuration shown by the presence of atmospheric pressure therein. Therefore, diaphragm 70 functions to provide a circular choke or throttling gap 98 which causes the negative air bearing to function as a frictionless vacuum cup.

According to another feature of the invention, the degree of load imposed on traction wheel 48 is rendered variable by the provision of a panel valve 100 slidably mounted on the wall of sleeve 32 over an aperture 102 formed therein. In operation, the position of valve 100 is varied to provide an alternate path through aperture 102 for entrance of intake air so that the blower assembly may be operated at the level required to adequately support platform 2 and the load thereon without inducing unnecessarily high tractive loading of traction wheel 48. In the preferred embodiment, valve 100 is preferably operated by an electric motor device 104 which is remotely controllable from the operator's station. In practice, valve 100 will initially be moved to a position completely opening aperture 102 and subsequently gradually closed until the portion of intake air passing over negative air bearing 64 is sufficient to produce the tractive effort needed to propel and provide directional control of the supported load.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In combination, a superatmospheric pressure energized load supporting structure, a traction wheel connected to said load supporting structure for free vertical movement relative thereto, a subatmospheric pressure energized ground proximate attraction device mounted in fixed vertical relation to said traction wheel, air flow generating means on one of said structures, and means connecting said subatmospheric pressure energized attraction device and said superatmospheric pressure energized load supporting structure to the intake and exhaust sides respecively of said air flow generating means.

2. In combination, a superatmospheric pressure energized load supporting structure, a steerable powered traction wheel connected to said load supporting structure for free vertical movement relative thereto, a subatmospheric pressure energized ground proximate attraction device mounted in fixed vertical relation to said traction wheel, air flow generating means on one of said structures, and means connecting said subatmospheric pressure energized attraction device and said superatmospheric pressure energized load supporting structure to the intake and exhaust sides respectively of said air flow generating means.

3. In combination, a load supporting structure including a superatmospheric pressure energized ground proximate air bearing, a powered traction wheel hinged to said load supporting structure for free vertical movement relative thereto, a subatmospheric pressure energized ground proximate attraction device mounted in fixed vertical relation to said traction wheel, air flow generating means on one of said structures having an intake side and an exhaust side, passage means connecting said subatmospheric pressure energized attraction device to said intake side, and means coupling said superatmospheric pressure energized bearing said exhaust side.

4. The structure set forth in claim 3 including means forming a variable opening in said passage means communicating with atmosphere enabling intake flow in bypass relation to said subatmospheric pressure energized attraction device.

5. In combination, a load supporting structure, a powered ground engaging traction wheel connected to said supporting structure movable vertically independently of said structure, air flow generating means on said structure including a housing having an intake side and an exhaust side, a positive pressure ground proximate air bearing disposed beneath said structure connected to the exhaust side of said housing, and a negative pressure ground proximate air bearing mounted in fixed vertical relation to said wheel and connected to the intake side of said housing.

6. In combination, a load supporting structure, a powered ground engaging dirigible traction wheel connected to said supporting structure movable vertically independently of said structure, air flow generating means on said structure including a housing having an intake side and an exhaust side, a positive pressure air bearing disposed beneath said structure connected to the exhaust side of said housing, a negative pressure air bearing mounted in fixed vertical relation to and surrounding said wheel, and flexible means connecting said last mentioned bearing to the intake side of said housing.

7. In a transport device, the combination of a load supporting structure, a steerable powered ground engaging traction wheel hingedly connected to said structure on a horizontal axis, positive pressure air bearing means for supporting said structure in frictionless relation to the ground, negative pressure air bearing means for exerting an attraction force relative to the ground urging said traction wheel into enagement therewith, and means for inducing positive and negative air pressure respectively in said bearings.

8. In a transport device, the combination of a load supporting structure, a power steerable power driven ground engaging traction wheel hingedly connected to said structure on a horizontal transverse axis, positive pressure air bearing means for supporting said structure in frictionless relation to the ground, negative pressure air bearing means for exerting an attraction force relative to the ground urging said traction wheel into engagement therewith, and air flow generating means coupled to said bearings in a manner where the appropriate pressure condition is in the respective bearings.

9. In combination, a load supporting platform having low unit loading superatmospheric pressure energized ground proximate air bearing means disposed thereunder, air flow generating means on one of said structures having its exhaust side connected in communicating relation with said air bearing means, a vertically directed bell housing disposed adjacent to said platform and hingedly connected thereto on a horizontal axis, means connecting the interior of said bell housing in communicating relation with the intake side of said air flow generating means, a ground engaging traction wheel rotatably and steerably mounted in said housing, and a subatmospheric pressure energized ground proximate attraction device mounted on the lower extremity of said bell housing in surrounding relation with said wheel.

10. The structure set forth in claim 9 wherein said subatmospheric pressure energized attraction device is toroidal in form and disposed concentric with the steer axis of said wheel.

References Cited by the Examiner
UNITED STATES PATENTS 3,209,849   10/1965   Gondert et al. ———————— 180—7

BENJAMIN HERSH, *Primary Examiner.*

M. S. SALES, *Assistant Examiner.*